United States Patent
Mayer et al.

(10) Patent No.: US 10,120,359 B2
(45) Date of Patent: Nov. 6, 2018

(54) DEVICE AND METHOD FOR THE AUTOMATED DETECTION OF AN INTERFACE

(75) Inventors: Elmar Mayer, Nussdorf (DE); Alexander Kobler, Burgkirchen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 794 days.

(21) Appl. No.: 13/141,028

(22) PCT Filed: Nov. 3, 2009

(86) PCT No.: PCT/EP2009/064489
§ 371 (c)(1),
(2), (4) Date: Jun. 20, 2011

(87) PCT Pub. No.: WO2010/069664
PCT Pub. Date: Jun. 24, 2010

(65) Prior Publication Data
US 2011/0258358 A1    Oct. 20, 2011

(30) Foreign Application Priority Data
Dec. 18, 2008   (DE) .................. 10 2008 054 887

(51) Int. Cl.
G05B 19/042    (2006.01)

(52) U.S. Cl.
CPC ............ *G05B 19/0423* (2013.01); *G05B 2219/25217* (2013.01)

(58) Field of Classification Search
CPC ............. G05B 19/0423; G05B 2219/25217
(Continued)

(56) References Cited

U.S. PATENT DOCUMENTS

| 6,043,768 A | 3/2000 | Strasser et al. |
| 6,789,127 B1 | 9/2004 | Chandra et al. |

(Continued)

FOREIGN PATENT DOCUMENTS

| DE | 197 01 310 B4 | 8/1997 |
| DE | 10 2006 059 749 A1 | 6/2008 |

(Continued)

OTHER PUBLICATIONS

Machine translation of WO 2008074401, Jun. 26, 2008.*

(Continued)

*Primary Examiner* — Tim T Vo
*Assistant Examiner* — Phong H Dang
(74) *Attorney, Agent, or Firm* — Hunton Andrews Kurth LLP (57) ABSTRACT

In a device and a method for the automated detection of an interface between a position-measuring device and sequential electronics that are interconnected via a data-transmission channel, the position-measuring device includes an interface unit and a position-measuring unit. The interface unit is connected first of all to the data-transmission channel, and secondly to the position-measuring unit for the purpose of an internal data exchange. The interface to the sequential electronics is selectable in the interface unit from at least two interfaces. Also disposed in the position-measuring device is an interface-detection unit, which is supplied with at least one input signal that arrives from the sequential electronics via the data-transmission channel, and which includes a device for determining the time sequence of signal edges of the at least one input signal in conjunction with the signal status, as well as an evaluation unit in which the interface used to the sequential electronics is detectable by evaluating the time sequence determined, and is selectable in the interface unit.

18 Claims, 4 Drawing Sheets

(58) Field of Classification Search
USPC ............... 710/11, 16, 63, 64, 72, 104, 105; 702/150
See application file for complete search history.

(56) References Cited

U.S. PATENT DOCUMENTS

| | | |
|---|---|---|
| 7,793,017 B2 | 9/2010 | Gehring et al. |
| 2002/0049506 A1* | 4/2002 | Birk et al. ................. 700/69 |
| 2003/0200323 A1* | 10/2003 | Dold ................. G05B 19/042 709/230 |
| 2005/0228509 A1 | 10/2005 | James |
| 2006/0282580 A1 | 12/2006 | Russell, III et al. |
| 2009/0070504 A1* | 3/2009 | Kostadinov ................. 710/105 |
| 2011/0116501 A1* | 5/2011 | Beaury et al. ................. 370/389 |
| 2011/0213586 A1* | 9/2011 | Kobler et al. ................. 702/150 |

FOREIGN PATENT DOCUMENTS

| | | |
|---|---|---|
| EP | 0 171 579 A1 | 2/1986 |
| EP | 0 542 657 A1 | 5/1993 |
| EP | 0 660 209 B2 | 6/1995 |
| EP | 1 873 597 | 1/2008 |
| JP | 8-185591 | 7/1996 |

OTHER PUBLICATIONS

Digital Signal, <http://en.wikipedia.org/wiki/Digital_signal>, accessed Sep. 22, 2014.*
Signal Edge, <http://en.wikipedia.org/wiki/Signal_edge>, accessed Sep. 22, 2014.*
Rotary Encoder, Heidenan, Apr. 2015.*
EnDat 2.2—Bidirectional Interface for Position Encoders, Heidenhain, Aug. 2005.*
Synchronous Serial Interface, <http://en.wikipedia.org/wiki/Synchronous_Serial_Interface<http://en.wikipedia.org/wiki/Synchronous_Serial_Interface>, accessed Apr. 27, 2015.*
RS-485 < http://en.wikipedia.org/wiki/RS-485>, accessed Apr. 27, 2015.*
International Search Report, issued in corresponding International Application No. PCT/EP2009/064489.

* cited by examiner

DEVICE AND METHOD FOR THE AUTOMATED DETECTION OF AN INTERFACE

FIELD OF THE INVENTION

The present invention relates to a device and a method for the automated detection of an interface between a position-measuring device and sequential electronics. With the aid of such a device and a method, automated detection of the interface used by the sequential electronics is possible in the position-measuring device.

BACKGROUND INFORMATION

Position-measuring devices which provide an absolute position value are being used increasingly in automation technology. Certain disadvantages of what are termed incremental position-measuring devices are thereby eliminated such as, for example, the necessity of carrying out a homing procedure after the switch-on operation in order to find a reference position which is used as reference point for the further position measuring by counting graduation marks.

Primarily serial data interfaces are used for transmitting absolute position values, since they make do with only a few data-transmission lines, and nevertheless, have high data-transmission rates. Particularly advantageous here are what are called synchronous serial interfaces, which have one unidirectional or bidirectional data line and one clock line. Data packets are transmitted via the data line in synchronism with a clock signal on the clock line. A multitude of standard interfaces have gained acceptance in automation technology; for example, popular representatives for synchronous serial interfaces are the EnDat interface of HEIDENHAIN, and a further is known under the name SSI. In addition, asynchronous serial interfaces such as Hiperface are also prevalent.

The SSI interface is described in European Published Patent Application No. 0 171 579. It is a synchronous serial data interface having one unidirectional data line and one unidirectional clock line. Position values from a position-measuring device are read out here in synchronism with a clock signal on the clock line.

On the other hand, European Patent No. 0 660 209 describes the fundamentals of the EnDat interface. It is likewise a synchronous serial interface which, however, besides the unidirectional clock line, has a bidirectional data line. It is thereby possible to transmit data in both directions—from the sequential electronics to the position-measuring device and from the position-measuring device to the sequential electronics. The data is transmitted in synchronism with a clock signal on the clock line here, as well.

German Patent No. 197 01 310 describes a device for transmitting data between a sensing element in the form of a position-measuring system, and a processing unit. By transmitting a reference signal on one of the signal-transmission lines, via which data is transmitted between the sensing element and the processing unit, it is possible to switch the position-measuring system to various operating modes.

Standardized interfaces offer the advantage that measuring devices which are equipped with such an interface may be connected directly to sequential electronics, e.g., a machine-tool control. However, a disadvantage for the measuring-device manufacturer is that it must offer the measuring devices with various standard interfaces in order to be able to provide solutions for sequential electronics that are already equipped with a specific interface. The result is a great variety of versions, which requires high expenditure for product revisions and complicates stockkeeping considerably.

Japanese Published Patent Application No. 8-185591 describes an absolute position-measuring device which supports a plurality of transmission formats. The transmission format is selected via a selection signal, which is supplied to the position-measuring device via additional lines from the sequential electronics. The requirement to make additional lines available increases the cabling expenditure considerably, and is therefore undesirable. In addition, this solution is inflexible, since the transmission format must be established manually.

SUMMARY

Example embodiments of the present invention provide a device and a method by which the interface is able to be detected by the position-measuring device.

A device is provided for the automated detection of an interface between a position-measuring device and sequential electronics which are interconnected via a data-transmission channel, the position-measuring device including an interface unit and a position-measuring unit. The interface unit is connected first of all to the data-transmission channel, and secondly to the position-measuring unit for the purpose of exchanging data. The interface to the sequential electronics is selectable in the interface unit from at least two interfaces. Also disposed in the position-measuring device is an interface-detection unit which is supplied with at least one input signal that arrives from the sequential electronics via the data-transmission channel, and which includes a device for determining the time sequence of signal edges of the at least one input signal in conjunction with the signal status, as well as an evaluation unit in which the interface used for the sequential electronics is detectable by evaluating the time sequence determined, and is selectable in the interface unit.

A method is provided for the automated detection of an interface between a position-measuring device and sequential electronics which are interconnected via a data-transmission channel, the position-measuring device including an interface unit and a position-measuring unit. The interface unit is connected first of all to the data-transmission channel, and secondly to the position-measuring unit for the purpose of exchanging data. The interface to the sequential electronics is selectable in the interface unit from at least two interfaces. Also disposed in the position-measuring device is an interface-detection unit, which is supplied with at least one input signal that arrives from the sequential electronics via the data-transmission channel. The method includes:
  Determining a time sequence of signal edges of the at least one input signal in conjunction with a signal status,
  Ascertaining the interface used to the sequential electronics by evaluating the determined sequence on the basis of decision criteria in an evaluation unit, and
  Selecting the ascertained interface in the interface unit.

Further advantages and details pertaining to example embodiments of the present invention are described in more detail in the following description of a device and a method for the automated detection of an interface, with reference to the Figures.

DETAILED DESCRIPTION

Figure 1:
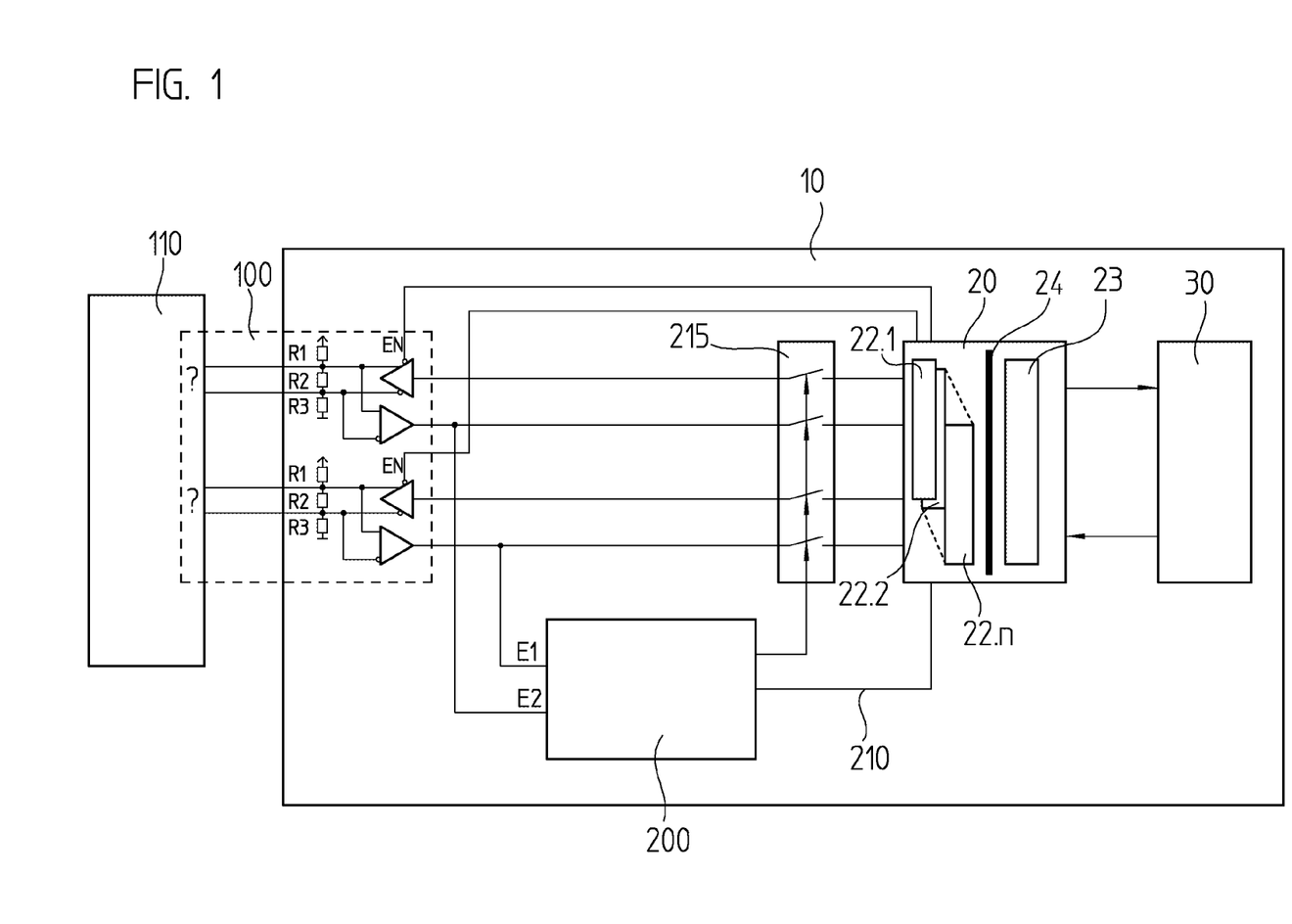
FIG. 1 shows a block diagram of a device according to an example embodiment of the present invention.

FIG. 1 shows a block diagram of a device according to an example embodiment of the present invention, having a position-measuring device 10 which is connected via a data-transmission channel 100 to sequential electronics 110, e.g., a numerical machine-tool control (NC). Position-measuring device 10 and sequential electronics 110 exchange commands and data via data-transmission channel 100. Such a system is usually a master-slave connection in which sequential electronics 110 assume the function of the master and position-measuring device 10 assumes the function of the slave, that is, every data transmission is initiated by sequential electronics 110, while position-measuring device 10 transmits data to sequential electronics 110 only upon request. The physical connection between sequential electronics 110 and position-measuring device 10 for the purpose of data transmission (represented by data-transmission channel 100) in conjunction with the related rules, what is termed the interface protocol, is denoted as interface.

Data-transmission channel 100 is mostly arranged for serial data transmission, that is, it includes at least one serial data connection which, if the transmission takes place differentially according to the RS-485 standard, includes at least one pair of lines and is terminated on both sides with suitable driver-/receiver modules. If the transmission takes place via only one bidirectionally operated, differential pair of lines, one also speaks of a 2-wire interface. A popular example for this is the parameter channel of the Hiperface interface. On the other hand, the EnDat and SSI interfaces mentioned above use two differential pairs of lines and are therefore referred to as 4-wire interfaces. Terminating resistors R1, R2, R3, which are used to damp signal reflections on the lines, are also shown by way of example in FIG. 1. In practice, terminating resistors R1, R2, R3 may be provided both on the side of position-measuring device 10 and on the side of sequential electronics 110. Differential data transmission has been familiar to those skilled in the art for a long time, and is therefore not further described here.

Figure 2A:
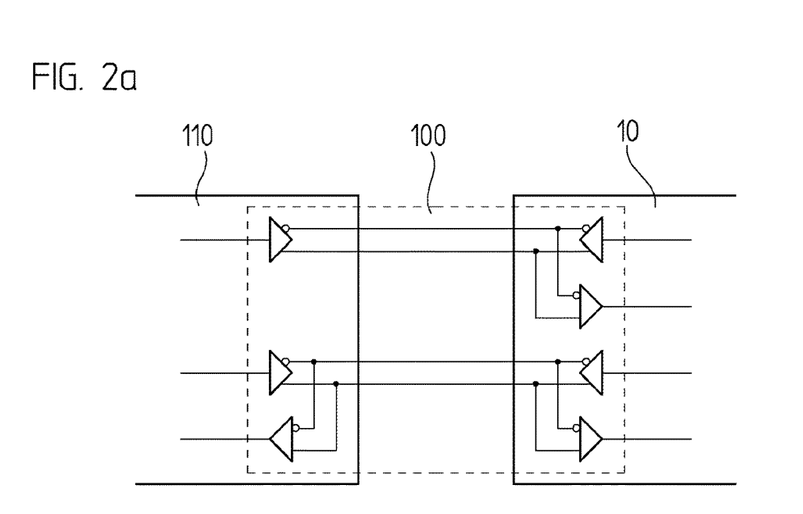
FIG. 2a shows a data-transmission channel having one unidirectionally operated pair of lines and one bidirectionally operated pair of lines.
Figure 2B:
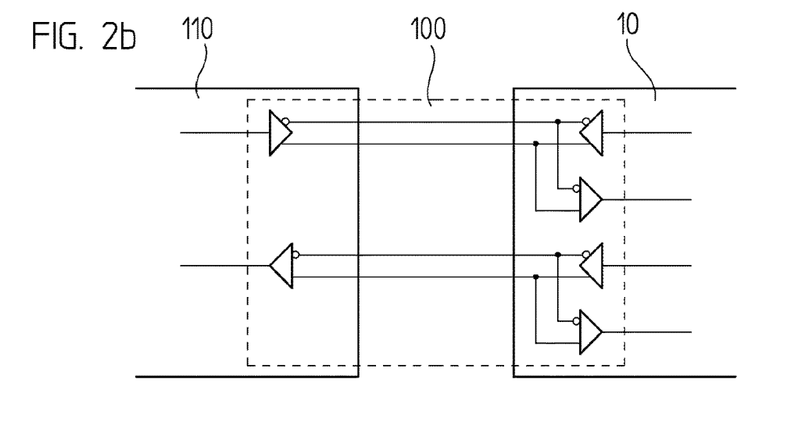
FIG. 2b shows a data-transmission channel having two pairs of lines operated unidirectionally in different data directions.
Figure 2C:
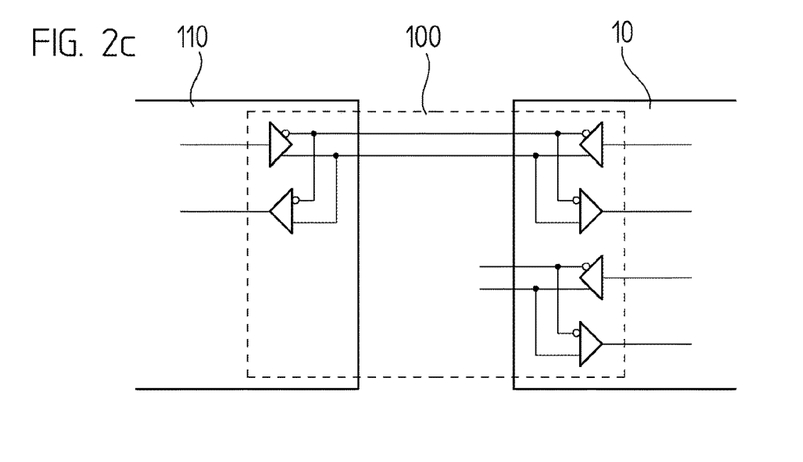
FIG. 2c shows a data-transmission channel having one bidirectionally operated pair of lines.

In this example, position-measuring device 10 is intended to be suitable for the automated detection of 2-wire interfaces and 4-wire interfaces. Moreover, the two possible pairs of signal lines are intended to be usable in any manner desired, and are therefore interchangeable. In this context, the variants shown in FIGS. 2a through 2c must be taken into account:
- one unidirectionally operated pair of lines, one bidirectionally operated pair of lines (FIG. 2a)
- two unidirectional pairs of signal lines operated in different data directions (FIG. 2b)
- one bidirectionally operated pair of signal lines (FIG. 2c)

In order to permit interchangeability, as well, the two pairs of signal lines of data-transmission channel 100 are terminated on the side of position-measuring device 10 with one differential transmitter-/receiver pair each. On the side of sequential electronics 110, in each case only the receiver-/transmitter modules are present which the interface used requires.

Data-transmission channel 100 is connected in position-measuring device 10 to an interface unit 20 which receives commands and input data from sequential electronics 110, interprets them, and passes them on via an internal interface to a position-measuring unit 30. It processes commands and input data and, if output data, e.g., an absolute position value, is requested, transmits it via the internal interface to interface unit 20, which prepares the output data according to the interface protocol and transmits it to sequential electronics 110.

By scanning a measuring standard using a scanning unit, position-measuring unit 30 generates position signals and converts them into digital position values which indicate the absolute position of the scanning unit relative to the measuring standard. The physical principle underlying the scanning is not relevant in this case; for example, optical, magnetic or inductive measuring principles may be used. In addition to position values, further data may be generated in position-measuring unit 30. For instance, this includes further measured values resulting from the relative movement between the scanning unit and the measuring standard, such as speed or acceleration. However, the further data may also concern measured values which relate to the ambient conditions, e.g., temperature values. Finally, status information may also be made available as further data, e.g., in the form of status bits or a status word whose bits signal warning conditions or fault conditions.

Position-measuring unit 30 may include still further components such as a CPU for performing complex computations, as well as a memory unit, which were not shown. Access to the components located in position-measuring unit 30, i.e., the exchange of data with these components, takes place via interface unit 20.

The internal communication in position-measuring device 10, which takes place between interface unit 20 and position-measuring unit 30 via the internal interface, is largely independent of the interface protocol that determines the communication between sequential electronics 110 and position-measuring device 10 via data-transmission channel 100. To permit the fastest possible exchange of data between interface unit 20 and position-measuring unit 30 via the internal interface, preferably parallel data transmission is used. The time span between the arrival of a command via data-transmission channel 100 and the sending of requested data (e.g., the position value) via data-transmission channel 100 may thereby be minimized.

Interface unit 20 is switchable, that is, interface unit 20 offers a selection from at least two interfaces, e.g., EnDat and SSI, from which one may be selected. In this manner, position-measuring device 10 may be connected to sequential electronics 110 which support either SSI or EnDat interfaces.

Position-measuring devices 10 which support a plurality of different interfaces drastically reduce the variety of versions required, since they are able to be connected, without expenditure, to many sequential electronics 110 by the simple selection of one interface which is supported both by sequential electronics 110 and by position-measuring device 10.

Preferably, interface unit 20 has a modular configuration and offers specific interface modules 22.1, 22.2 through 22.*n* for the interfaces supported, from which one is selected corresponding to the interface used by sequential electronics 110. In addition to specific interface modules 22.1, 22.2 through 22.*n*, advantageously one general interface module 23 is provided, which communicates with specific interface modules 22.1, 22.2 through 22.*n* via a standard interface 24. In this manner, the functional scope of specific interface modules 22.1, 22.2 through 22.*n* may be reduced to the conversion of the commands and input data, received from sequential electronics 110, to a standardized command or data format, and the conversion of output data from a standardized data format to a specific data format for transmission to sequential electronics 110.

For the automated detection of the connected interface, an interface-detection unit 200, to which input signals E1, E2 are supplied that arrive via data-transmission channel 100, is disposed in position-measuring device 10. Of course, the number of input signals is limited to two only in this exemplary embodiment. Both interfaces which transmit only one input signal and interfaces which transmit more than two input signals are known in practice. As explained in greater detail below, the detection is accomplished by analyzing the time sequence of signal edges and signal levels of the input signals. So long as the interface has not been detected, the connection of interface unit 20 to data-transmission channel 100 is interrupted. A switch element 215 is provided for that purpose. In addition, the driver modules which are provided for transmitting data to sequential electronics 110 are switched to inactive; thus, signals arriving via data-transmission channel 100 are analyzed exclusively. After the interface has been detected, interface detection unit 200 switches interface unit 20, e.g., via a selection line 210, accordingly, that is, selects one specific interface module 22.1, 22.2 through 22.*n* and produces the connection between interface unit 20 and data-transmission channel 100 again via switch element 215.

To ensure that the interface is also detected correctly, after the detection, it is expedient to provide a checking sequence that is capable of reliably verifying the data transmission between sequential electronics 110 and position-measuring device 10.

Advantageously, the automated detection of the interface is restricted to one special programming mode of position-measuring device 10, which position-measuring device 10 is in after delivery. After the successful detection of the interface during the initial operation of position-measuring device 10 in connection with sequential electronics 110, the result is stored in a nonvolatile memory, e.g., an EEPROM, and the selected specific interface module 22.1, 22.2 through 22.*n* is permanently set, so that if the interface used has been detected once, no further automatic detection process is necessary. The programming mode is subsequently ended.

Furthermore, a special mechanism may be provided to switch position-measuring device 10 into the programming mode again. For example, as described in German Patent No. 197 01 310, the switchover to the programming mode may be initiated by a reference signal which is transmitted from sequential electronics 110 to the position-measuring device on one of the signal-transmission lines of data-transmission channel 100.

Figure 3:
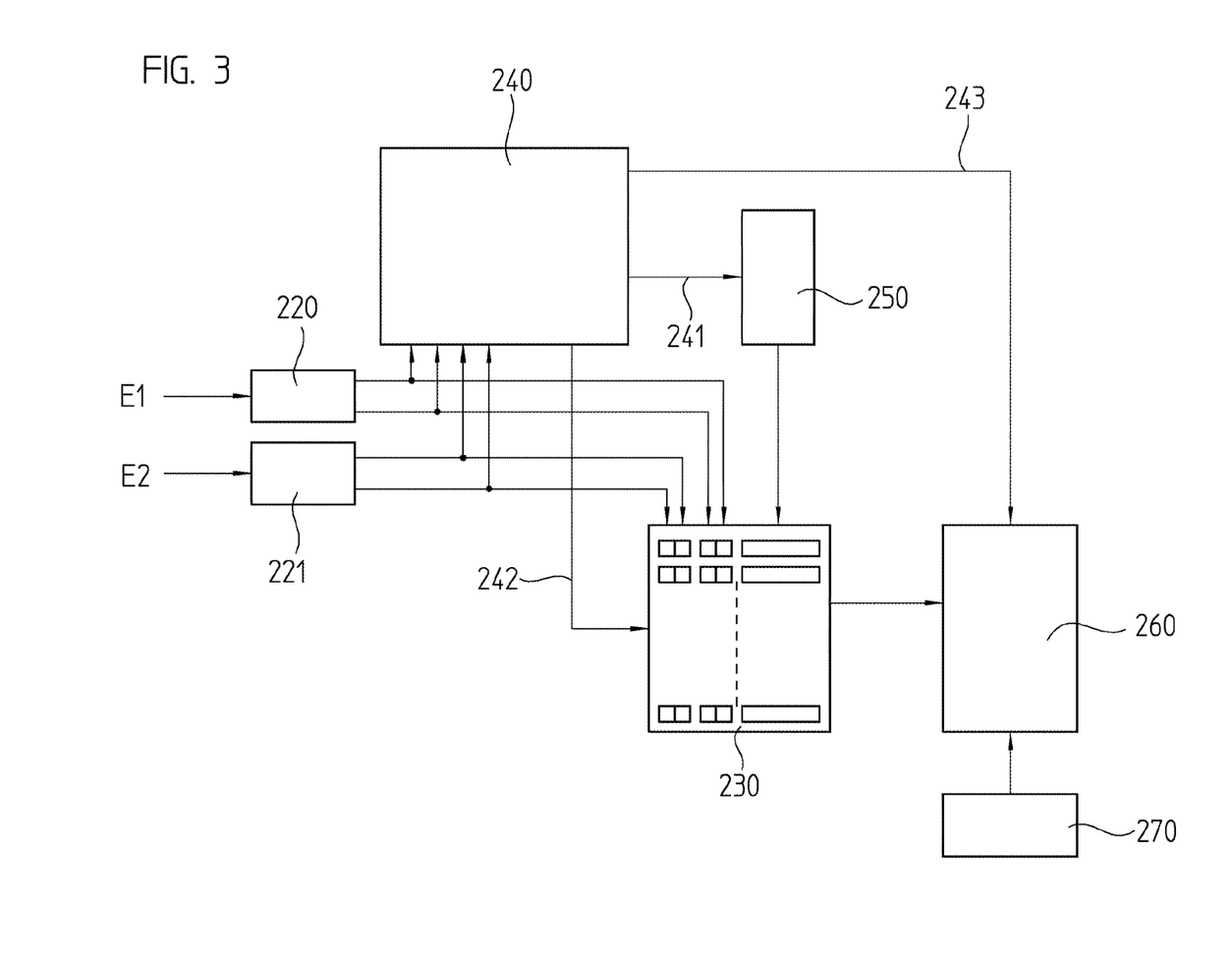
FIG. 3 shows a block diagram of an interface-detection unit.

The automated interface detection shall now be clarified further with reference to the block diagram of an interface-detection unit 200 shown in FIG. 3. Input signals E1, E2, which arrive at interface-detection unit 200 via data-transmission channel 100, are supplied to edge-detection units 220, 221. They code signal statuses and signal transitions of respective input signals E1, E2 on two status lines each, whose digital signal levels are assigned to the four statuses and transitions low-level
high-level
rising edge
falling edge and are supplied to a control unit 240 and to a status memory unit 230. In certain implementations, edge-detection units 220, 221 also detect the "tristate" or "high-resistance" status.

If control unit 240 detects an edge in the case of one of input signals E1, E2, it evaluates the event as the beginning of a data transmission and begins a detection sequence by starting a timer 250 by a start line 241, and storing the digital signal levels of the status lines as well as the value of timer 250 in status memory unit 230 with the aid of a write line 242. This storage process is repeated for a fixed number of signal edges. In this manner, status memory unit 230 is filled with data records that include signal statuses and transitions of input signals E1, E2 and the instants, commonly referred to as time stamps, associated with them. Alternatively, timer 250 may also already be started immediately after the switch-on operation, e.g., after a switch-on reset process. If timer 250 is started only once and then counts continuously, the time between two signal edges or up to the first signal edge (if timer 250 is already started after the switch-on operation) may be formed by forming the difference between two timer values. On the other hand, if timer 250 is restarted in response to each detected signal edge, then the timer value corresponds directly to the time between two signal edges.

The number of data records needed depends upon how many and which interfaces are to be detected. At least a sufficient number of data records must be recorded so that of all interfaces in question, exactly one interface may be ascertained unambiguously. In order to produce a redundancy, it is especially advantageous to record additional data records, so that a check/confirmation of the ascertained interface is possible.

When a sufficient number of data records have been recorded, the control unit stops timer 250 and signals an evaluation unit 260 via an evaluation line 243 that it may evaluate the data records. The data records are evaluated by analysis of the time sequence of the signal transitions (edges) and the associated signal statuses, and comparison to characteristic signal sequences of available interfaces that are stored in a database 270, for example. The evaluation may include checking for one or more of the following decision criteria:

signal level prior to the first signal edge
detection of a clock signal
determining the frequency of a clock signal
detection of an asynchronous data transmission
detection of an identification code
consideration of signal levels of a second input signal in the context of signal edges of a first input signal For example, an identification code may be a pulse train which allows the specific selection of one interface, regardless of the actual version of the interface (synchronous/asynchronous, number of input signals . . . ). The validity of the identification code is advantageously restricted to the programming mode.

As a special case, it should be mentioned that the absence of signal edges, thus, the determination that input signals E1, E2 exhibit a constant logic level a defined time after the switch-on operation, that is, after the beginning of the detection process, may also be used as a decision criterion.

Which decision criteria are conducive to an unambiguous detection of the interface used is a function of the type and number of interfaces available or to be detected. For example, if only two interfaces that have different quiescent levels are to be differentiated, then the consideration of the signal levels prior to the first clock-pulse edge already suffices. The decision as to whether it is a synchronous or an asynchronous interface may be made after the detection of a clock signal or a characteristic signal sequence. In order to differentiate two synchronous interfaces, the signal levels of the second input signal may be considered in the context of signal edges of the (already detected) clock signal.

After the interface used has been detected, evaluation unit 260 selects the corresponding interface via selection line 210.

Alternatively, the evaluation may also be accomplished without previous buffer storage by supplying the data records directly to evaluation unit 260. In this case, however, high processing speed is necessary in evaluation unit 260.

An example of the detection of the interface used when it is only necessary to distinguish between the interfaces SSI and EnDat shall now be explained with reference to FIGS. 4a and 4b.

Figure 4A:
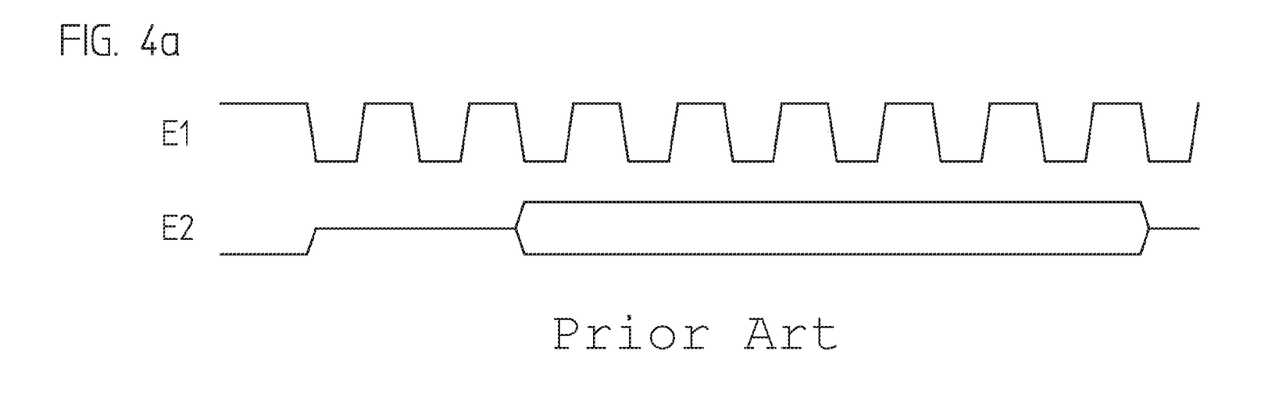
FIG. 4a shows a signal diagram of the beginning of a data transmission in the case of the interface EnDat.

FIG. 4a shows the beginning of a data transmission from sequential electronics 110 via data-transmission channel 100 to position-measuring device 10 using the interface EnDat which is described, for example, in European Patent No. 0 660 209. After the switch-on operation, first input signal E1 is at high level, while the level of second input signal E2 is low. In this example, first input signal E1 corresponds to the signal on the clock line, while second input signal E2 represents the signal on the bidirectionally operated data line.

The transmission begins with a falling edge of first input signal E1, while second input signal E2 in the initial state, thus, immediately after the switch-on operation, is switched to high-resistance (tristate status). In the high-resistance state, a voltage sets in on second signal line E2 which is determined by terminating resistors R1, R2, R3. As already mentioned above, they are needed in digital data transmission to damp signal reflections. Terminating resistors R1, R2, R3 are usually dimensioned such that the resulting voltage on second signal line E2 is interpreted by the receiving side, in this case, position-measuring device 10, unambiguously either as high-level or low-level, terminating resistors R1, R2, R3 preferably being dimensioned such that position-measuring device 10 detects a high level. With the third falling edge, sequential electronics 110 begins with the transmission of a command (in the terminology of European Patent No. 0 660 209, denoted as status command). It includes three bits transmitted in succession, which subsequently are repeated in inverted fashion. However, in an alternative example embodiment of the EnDat interface, the command may also be repeated in the same polarity.

Figure 4B:
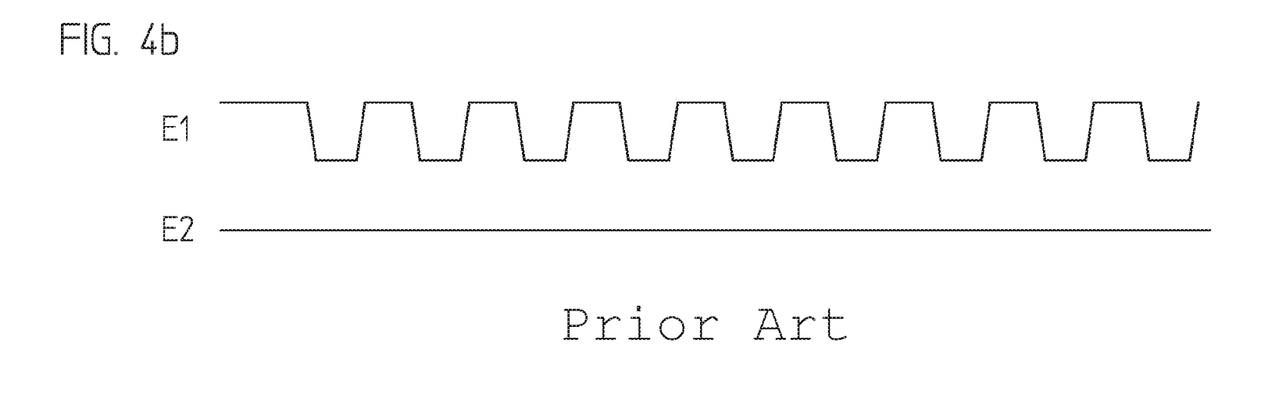
FIG. 4b shows a signal diagram of the beginning of a data transmission in the case of the interface SSI.

On the other hand, FIG. 4b shows the signal statuses at the beginning of a data transmission when using the SSI interface which, as already mentioned in the introduction, is described in European Published Patent Application No. 0 171 579. Assuming that first input signal E1 is the signal on the clock line and second input signal E2 is the signal on the data line, first input signal E1 is likewise at high level in the initial state, and the data transmission begins with a falling edge of first input signal E1. Since in the case of SSI, the data line is operated unidirectionally from position-measuring device 10 to the sequential electronics and the driver modules are inactive during the automated detection of the interface, then regardless of input signal E1, second input signal E2 remains constantly at the same level, which in turn, is determined by terminating resistors R1, R2, R3. In the example shown, second input signal E2 has a constant low level.

The clock line is able to be identified in evaluation unit 260, because after the first edge, the signal on this line (first input signal E1 in the example) has further edges at regular time intervals.

In this example, the detection of the clock line is not adequate as a decision criterion for determining the interface used, since synchronous interfaces are involved in both cases. Here, for example, the consideration of signal levels of second input signal E2 in the context of signal edges of a first input signal E1 (the clock signal) may be utilized as a further decision criterion. Since no level change can occur on the data line in the case of the SSI interface, but in the case of the EnDat interface, a command is transmitted, thus the logic level on the data line changes, an unambiguous determination of the interface is possible. A previous level change at the instant at which second input signal E2 is switched to high-resistance in FIG. 4a is unreliable as a decision criterion, since it is dependent on the dimensioning of terminating resistors R1, R2, R3.

In this manner, decision criteria may be found for a plurality of different interfaces, permitting an automated detection by evaluation unit 260. Thus, for example, a sequence of signal edges at irregular intervals would be an indication of an asynchronous interface, via which an ASCII-coded character is transmitted.

Because position-measuring device 10 neither transmits nor receives data during the automated detection of the interface, access by sequential electronics 110 to position-measuring device 10 during this automated detection leads to transmission errors on the part of sequential electronics 110. However, since the automated detection takes place outside of the actual operation of position-measuring device 10, this is not problematic.

Moreover, it may occur that a single interface access is not sufficient for an unambiguous detection of the interface.

Thus, in FIG. 4a, assuming that the quiescent state for second input signal E2 is a low-level in the tristate status, the level is likewise set to low-level by terminating resistors R1, R2, R3, then the transmission of a command which is coded with the level sequence '000' and is merely repeated in the same polarity would likewise generate no change in level. A reliable decision between SSI and EnDat could not be made in this case.

Such combinations may be avoided if the interface commands to be used for the automated detection are predefined in startup instructions for a person who performs the initial startup of a machine in which position-measuring devices 10. If need be, the instruction to use several different interface commands if a first attempt has not led to success is already sufficient.

What is claimed is:

1. A device for automated detection of an interface between a position-measuring device and sequential electronics that are interconnected via a data-transmission channel, the position-measuring device including an interface unit and a position-measuring unit, the interface unit being connected to the data-transmission channel and to the position-measuring unit to exchange data, an interface to the sequential electronics being selectable in the interface unit from at least two interfaces, comprising:

an interface-detection unit arranged in the position-measuring device and adapted to be supplied with at least one input signal from the sequential electronics via the data transmission channel, and includes a device adapted to determine a time sequence of signal edges of the at least one input signal in conjunction with a signal state; and an evaluation unit adapted to ascertain an interface used by the sequential electronics by evaluation of the determined time sequence of signal edges, the interface selectable in the interface unit;

wherein the interface unit includes at least two specific interface modules, each specific interface module assigned to a single corresponding interface, the interface unit adapted to select the interface by selection of the corresponding specific interface module, each specific interface module adapted to communicate with the sequential electronic via the data transmission channel utilizing data and/or commands having a first respective format;

wherein the interface unit further includes a single general interface module connected to the specific interface modules via a standard interface and connected to the position-measuring unit, the general interface module adapted to communicate with the selected specific interface module utilizing data and/or commands having a second format; and wherein each specific interface module is adapted to convert commands and/or data, received from the sequential electronics via the data transmission channel, from the first respective format to the second format for transmission to the position-measuring unit via the general interface module and/or to convert commands and/or data, received from the position-measuring unit via the general interface module, from the second format to the first respective format for transmission to the sequential electronics via the corresponding specific interface module and the data transmission channel.

2. The device according to claim 1, wherein the device adapted to determine the time sequence of signal edges of the at least one input signal in conjunction with the signal state includes at least one edge-detection unit adapted to determine signal edges and signal statuses, and a timer adapted to determine the time sequence of the signal edges.

3. The device according to claim 1, further comprising a status memory unit arranged in the interface-detection unit and adapted to be supplied with and store the determined signal edges and signal statuses, and timer values associated with the signal edges.

4. The device according to claim 1, wherein the connection between the interface unit and the data-transmission channel is interruptible during automatic detection of the interface.

5. The device according to claim 1, wherein the position-measuring device is switchable to a programming mode for automated detection of the interface.

6. The device according to claim 1, wherein after detection is completed, the selection of the interface is storable.

7. A method for automated detection of an interface between a position-measuring device and sequential electronics that are interconnected via a data-transmission channel, the position-measuring device including an interface unit and a position-measuring unit, the interface unit connected to the data-transmission channel and to the position-measuring unit for an internal data exchange, the interface to the sequential electronics being selectable in the interface unit from at least two interfaces; and also arranged in the position-measuring device is an interface-detection unit suppliable with at least one input signal that arrives from the sequential electronics via the data-transmission channel, the interface unit including at least two specific interface modules and a single general interface module connected to the specific interface modules via a standard interface and connected to the position-measuring unit, each specific interface module assigned to a single corresponding interface and adapted to communicate with the sequential electronic via the data transmission channel utilizing data and/or commands having a first respective format, the general interface module adapted to communicate with the specific interface module utilizing data and/or commands having a second format, comprising:

determining a time sequence of signal edges of the at least one input signal in conjunction with a signal state;

ascertaining the interface used by the sequential electronics by evaluating the determined time sequence of signal edges on the basis of decision criteria in an evaluation unit, selecting the ascertained interface in the interface unit by selecting the corresponding specific interface module; and converting, by the selected specific interface module, commands and/or data, received from the sequential electronics via the data transmission channel, from the first respective format to the second format for transmission to the position-measuring unit via the general interface module and/or to converting, by the selected specific interface module, commands and/or data, received from the position-measuring device via the general interface module, from the second format to the first respective format for transmission to the sequential electronics via the corresponding specific interface module and the data transmission channel.

8. The method according to claim 7, further comprising determining signal edges and signal statuses of the at least one input signal in at least one edge-detection unit, wherein the time sequence of signal edges is determined by a timer.

9. The method according to claim 8, further comprising storing in a status memory unit the determined signal edges and signal statuses and timer values associated with the signal edges, the status memory unit being located in the interface-detection unit.

10. The method according to claim 7, further comprising interrupting the connection between the interface unit and the data-transmission channel during automatic detection of the interface.

11. The method according to claim 7, further comprising switching the position-measuring device to a programming mode for automated detection of the interface.

12. The method according to claim 7, further comprising storing the selection of the interface after detection is completed.

13. The method according to claim 7, wherein the method is performed by the device recited in claim 1.

14. The device according to claim 1, wherein the device is adapted to perform the method recited in claim 7.

15. The device according to claim 1, wherein the data-transmission channel connects the position measuring device and the sequential electronics with at least one pair of lines, and is terminated on both sides with driver-/receiver modules.

16. The device according to claim 1, wherein during the detection of the interface, driver modules which are provided for transmitting data to sequential electronics are switched to inactive.

17. The method according to claim 7, wherein the data-transmission channel connects the position measuring device and the sequential electronics with at least one pair of lines, and is terminated on both sides with driver-/receiver modules.

18. The method according to claim 7, wherein during the detection of the interface, driver modules which are provided for transmitting data to sequential electronics are switched to inactive.

* * * * *